(12) United States Patent
Jung (10) Patent No.: US 7,879,460 B2
(45) Date of Patent: Feb. 1, 2011

(54) WELDING WIRE AND VEHICLE COMPONENT MANUFACTURED USING THE SAME

(75) Inventor: Jae Gyu Jung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 66 days.

(21) Appl. No.: 12/277,721

(22) Filed: Nov. 25, 2008

(65) Prior Publication Data

US 2010/0047619 A1 Feb. 25, 2010

(30) Foreign Application Priority Data

Aug. 19, 2008 (KR) ...................... 10-2008-0080809

(51) Int. Cl.
*B32B 15/18* (2006.01)
*B23K 35/40* (2006.01)
*B23K 35/24* (2006.01)
*B23K 35/34* (2006.01)

(52) U.S. Cl. ...................... 428/682; 428/684; 228/56.3; 219/146.23; 420/52; 420/98; 420/408; 420/453

(58) Field of Classification Search ...................... None
See application file for complete search history.

(56) References Cited

U.S. PATENT DOCUMENTS 3,859,082 A * 1/1975 Denhard et al. ................ 420/44
3,966,424 A * 6/1976 Godai et al. ................. 428/558
4,086,463 A * 4/1978 Omori et al. ........... 219/145.22
5,304,346 A * 4/1994 O'Donnell et al. .......... 420/580
5,837,969 A * 11/1998 Siewert et al. ...... 219/137 WM
7,562,807 B2 * 7/2009 Coleman et al. ....... 228/262.41

FOREIGN PATENT DOCUMENTS

| FR | 2 027 269 | * | 9/1970 |
| JP | 4-135089 | | 5/1992 |
| JP | 4-162985 | | 6/1992 |
| JP | 2007-021570 | | 2/2007 |
| KR | 10-2007-0011569 | | 1/2007 |

* cited by examiner

Primary Examiner—Jennifer C McNeil
Assistant Examiner—Jason L Savage
(74) Attorney, Agent, or Firm—Edwards Angell Palmer & Dodge LLP; Peter F. Corless (57) ABSTRACT

Disclosed is a welding wire for joining cast iron and stainless steel, having a composition of 0.03 wt % or less of C, 2.0~3.0 wt % of Si, 12.0~14.0 wt % of Mn, 7.0~9.0 wt % of Cr, 45.0~47.0 wt % of Ni, 0.5~0.8 wt % of Nb, and 2.0~3.0 wt % of Mo, with a balance of Fe. Using the welding wire, a weld zone which has no hot cracks and is sound and good can be obtained.

3 Claims, 11 Drawing Sheets

WELDING WIRE AND VEHICLE COMPONENT MANUFACTURED USING THE SAME

CROSS-REFERENCE TO RELATED APPLICATIONS

This application claims under 35 U.S.C. §119(a) priority to Korean Application No. 10-2008-0080809, filed on Aug. 19, 2008, the disclosure of which is incorporated herein by reference in its entirety.

BACKGROUND OF THE INVENTION

1. Field of the Invention

The present invention relates to a welding wire for joining different materials, in particular, cast iron and stainless steel, and to a vehicle component manufactured using the welding wire.

2. Background Art

In vehicles, exhaust gas temperature is increased in proportion to the gasoline mileage. Generally, the exhaust gas temperature of a vehicle provided with a turbo engine or a GDI (Gasoline Direct Injection) engine is hot to the range of about 850~950° C., and vehicle makers have recently tried to further increase the exhaust gas temperature up to about 950~970° C.

The exhaust manifold of an engine exhaust system through which exhaust gas is passed is a component requiring high temperature properties, in particular, heat resistance, fatigue resistance and oxidation resistance, and the magnitude of a load applied thereto is gradually increased in proportion to increases in the exhaust gas temperature. Typically, an exhaust manifold used under conditions of an exhaust temperature of 800° C. or lower is manufactured through casting using nodular graphite cast iron, and an exhaust manifold (hereinafter, referred to as "high-temperature exhaust manifold") used at temperatures higher than the above temperature is suitably manufactured by subjecting a stainless steel sheet to pressing and then welding.

Figure 1A:
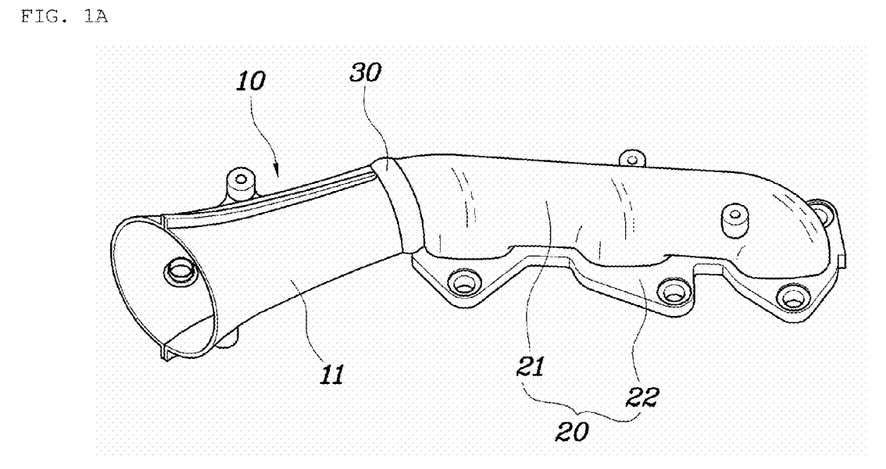
FIG. 1A is a photograph showing a high-temperature exhaust manifold to which a conventional welding wire is applied.
Figure 1B:
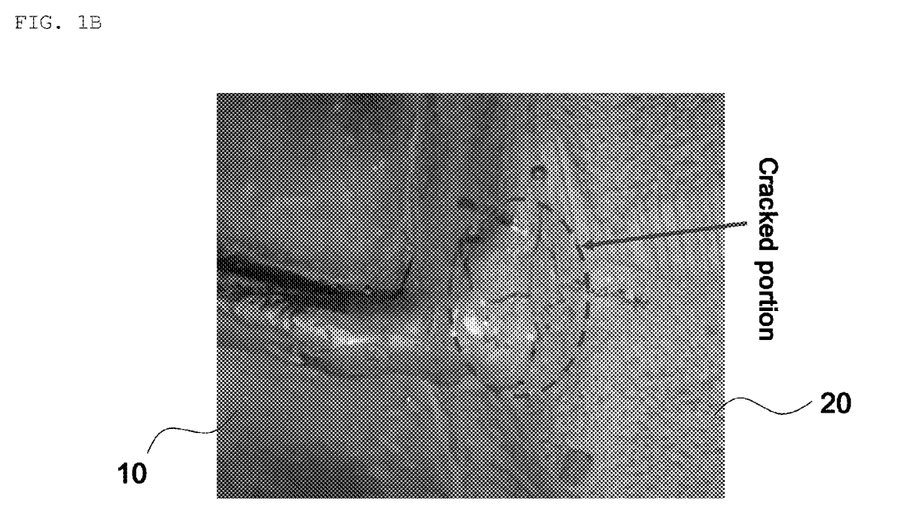
FIG. 1B is a partially enlarged photograph showing the weld zone of the exhaust manifold of FIG. 1A.

Stainless steel is much lighter than cast iron and has superior high-temperature properties, but is expensive. In order to reduce the cost, part of the high-temperature exhaust manifold is made using cast iron instead of stainless steel. Accordingly, and with reference to FIGS. 1A and 1B, a runner 21 and a flange 22, which are connected to an engine (not shown), are made of cast iron, whereas a diffuser 11 is made of stainless steel. Further, a stainless steel part 10 and a cast iron part 20 are welded to each other, thus suitably manufacturing a single exhaust manifold.

However, in the exhaust manifold thus manufactured, shortly after the welding process, solidification cracks or hot cracks (FIG. 1B) occur frequently in the joint, in particular, in the weld zone 30, of the exhaust manifold in which the stainless steel part 10 and the cast iron part 20 are joined to each other. Such a cracked portion or a weak portion causes leakage of the exhaust gas or may result in rupture.

The above information disclosed in this the Background section is only for enhancement of understanding of the background of the invention and therefore it may contain information that does not form the prior art that is already known in this country to a person of ordinary skill in the art.

SUMMARY OF THE INVENTION

The present invention provides a welding wire for suitably joining cast iron and stainless steel, which enables the formation of a sound joint without weld defects such as solidification cracks or hot cracks, and also provides a vehicle component manufactured using the welding wire.

According to the present invention, a welding wire may have a composition comprising 0.03 wt % or less of C, 2.0~3.0 wt % of Si, 12.0~14.0 wt % of Mn, 7.0~9.0 wt % of Cr, 45.0~47.0 wt % of Ni, 0.5~0.8 wt % of Nb, and 2.0~3.0 wt % of Mo, with the balance of Fe.

In addition, according to preferred embodiments of the present invention, a vehicle component may be manufactured by suitably joining a first part made of stainless steel and a second part made of cast iron using the welding wire as mentioned above.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other objects, features and advantages of the present invention will be more clearly understood from the following detailed description taken in conjunction with the accompanying drawings, in which:

FIGS. 4A and 4B are micrographs showing the weld zone after a stainless steel sheet and a cast iron sheet are welded to each other, in which FIG. 4A illustrates a case in which the welding wire of the comparative example is used and FIG. 4B illustrates a case in which the welding wire of the example according to the present invention is used;

FIGS. 6A to 6D are micrographs showing the weld zone after the stainless steel part and the cast iron part of the exhaust manifold are welded to each other using the welding wire of the comparative example, in which FIG. 6B illustrates the portion A of FIG. 6A and FIG. 6D illustrates the portion B of FIG. 6C;

FIGS. 7A to 7D are micrographs showing the weld zone after the stainless steel part and the cast iron part of the exhaust manifold are welded to each other using the welding wire of the example, in which FIG. 7B illustrates the portion C of FIG. 7A and FIG. 7D illustrates the portion D of FIG. 7C;

FIGS. 8A and 8B are photographs showing the ledeburite formed in the heat affected zone near the cast iron part, in which FIG. 8A illustrates a case in which the welding wire of the comparative example is used and FIG. 8B illustrates a case in which the welding wire of the example is used.

DESCRIPTION

As described herein, the present invention includes in one aspect a welding wire for joining cast iron and stainless steel, having a composition comprising 0.03 wt % or less of C, 2.0~3.0 wt % of Si, 12.0~14.0 wt % of Mn, 7.0~9.0 wt % of Cr, 45.0~47.0 wt % of Ni, 0.5~0.8 wt % of Nb, and 2.0~3.0 wt % of Mo, with a balance of Fe.

The invention also includes in another aspect a vehicle component manufactured by joining parts made of different materials, comprising a first part made of stainless steel, a second part made of cast iron, and a weld zone between the first part and the second part which are joined to each other using a welding wire having a composition comprising 0.03 wt % or less of C, 2.0~3.0 wt % of Si, 12.0~14.0 wt % of Mn, 7.0~9.0 wt % of Cr, 45.0~47.0 wt % of Ni, 0.5~0.8 wt % of Nb, and 2.0~3.0 wt % of Mo, with a balance of Fe.

The invention can also include a motor vehicle comprising a welding wire as described herein.

Hereinafter, a detailed description will be given of a welding wire and a vehicle component manufactured using the same according to preferred embodiments of the present invention, with reference to the appended drawings.

Typically, hot cracks or solidification cracks in a weld zone are caused by the grain-boundary segregation of a low-melting-point-compound-forming element such as P or S included in the metal to be welded. Carbon contained in a large amount (2.0 wt % or more) in cast iron is diffused toward surroundings during the welding process, and thus results in the formation of a hardened layer which is can be very brittle in the heat affected zone. Accordingly, such a hardened layer increases contraction stress due to the difference in cooling rate with surroundings during the solidification and further intensifies the generation and propagation of hot cracks or solidification cracks.

With reference to exemplary FIGS. 2 and 3, and in accordance with preferred embodiments of the invention as described herein, the weld structure formed in the joint between stainless steel and cast iron is described below.

Figure 2:
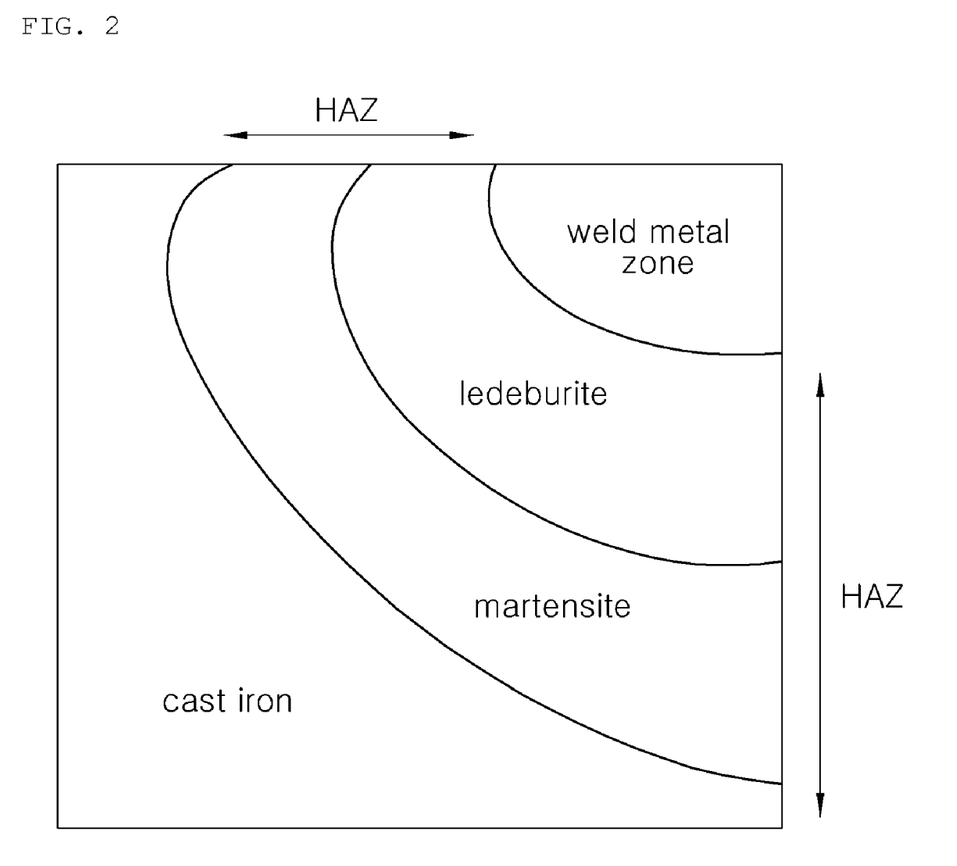
FIG. 2 is a view showing the weld structure formed through welding of stainless steel and cast iron.

Preferably, and as shown in exemplary FIG. 2, a weld zone includes a heat affected zone (HAZ) and a weld metal zone formed by melting and solidifying a base metal and a welding wire, called a filler metal. In certain embodiments, for example where stainless steel and cast iron are suitably welded to each other, a structure which is extremely hard and brittle, including ledeburite and martensite, is mainly formed in the heat affected zone near the cast iron.

Figure 3:
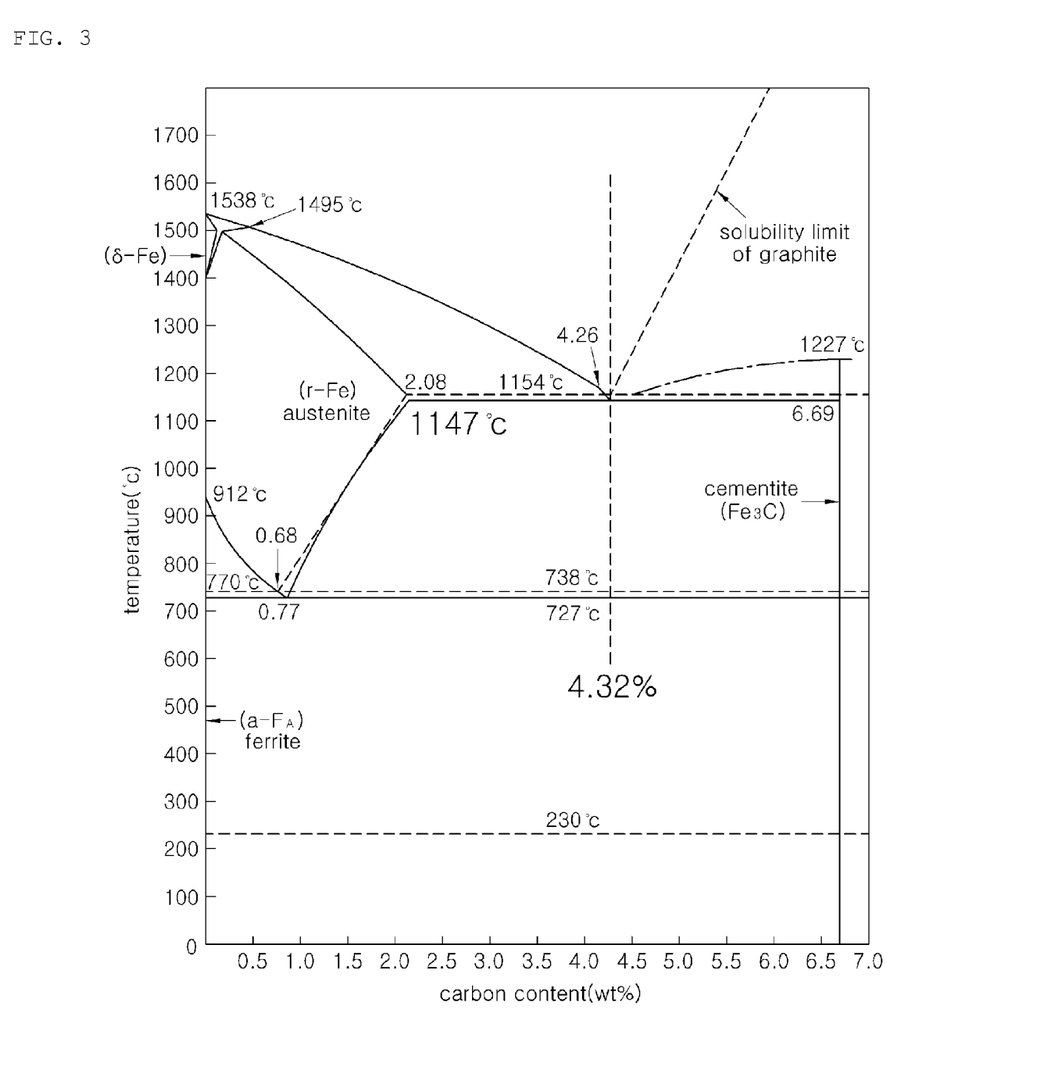
FIG. 3 is a view showing the Fe—C phase diagram.

According to other further embodiments, and as shown in exemplary FIG. 3, ledeburite, which is a eutectic structure of austenite and cementite ($Fe_3C$) occurring at a carbon content of 4.32 wt % and a temperature of 1147° C., is preferably formed by accumulating carbon in the heat affected zone near the fusion line of cast iron in the welding process, because of a high carbon content of cast iron. Ledeburite has hardness of about 800~1000 Hv and is harder and more brittle than martensite. In the course of cooling following the welding process, whereas austenite is decomposed into ferrite and cementite, ledeburite remains unchanged, such that solidification cracks occur in the joint between stainless steel and cast iron and the endurance life of the weld component is remarkably shortened.

Accordingly, it is an important consideration to the present invention that a welding wire alloy be suitably designed so that the formation of a brittle structure, in particular, ledeburite, is suitably inhibited in the weld zone. Preferably, in the welding wire according to the present invention, a large amount of Cr is contained, along with Ni and Mn for suitably stabilizing austenite. These elements function to maximize the solid solution amount of carbon of cast iron upon solidification of the weld zone to thus inhibit the production of martensite and ledeburite, and also to enlarge the austenitic region in the phase diagram to thus relatively decrease the amount of cementite to be produced, consequently suitably diminishing the production of martensite and ledeburite.

According to preferred embodiments of the invention as described herein, the welding wire according to the present invention has a composition as shown in Table 1 below. The conventional wire for welding stainless steel and cast iron preferably includes SUS 309L. Compared to SUS 309L, the welding wire according to the present invention has a composition in which Si, Mn and Ni contents are preferably considerably increased and Cr content is preferably decreased. For reference, SUS 309L has a composition including 0.03 wt % or less of C, 1.0 wt % or less of Si, 2.00 wt % or less of Mn, 0.045 wt % or less of P, 0.03 wt % or less of S, 22~24 wt % of Cr, and 12~15 wt % of Ni, with the balance of iron.

TABLE 1

| | Composition | | | | | | | |
|---|---|---|---|---|---|---|---|---|
| | C | Si | Mn | Cr | Ni | Nb | Mo | Fe |
| Content (wt %) | 0.03 or less | 2.0~3.0 | 12~14 | 7.0~9.0 | 45~47 | 0.5~0.8 | 2.0~3.0 | Balance |

The composition of the welding wire according to preferred embodiments of the present invention is specified below.

(i) Carbon (C): 0.03 wt % or Less

Carbon, which is diffused from the cast iron part in the welding process, suitably generates a brittle phase such as ledeburite in the heat affected zone near the fusion line, and combines with chromium at high temperatures to thus form carbides such as $Cr_{23}C_6$ at grain boundaries, undesirably decreasing the corrosion resistance of the weld zone. Accordingly, in preferred embodiments, the carbon content in the weld wire should be controlled to be as low as 0.03 wt % or less.

(ii) Silicon (Si): 2.0~3.0 wt %

Silicon, which is an element for improving oxidation resistance, suitably contributes to an increase in oxidation resistance of the weld zone. At a silicon content of about 2.0 wt %, oxidation resistance was greatly increased, and the degree of improvement in oxidation resistance was not large at a silicon content of 3.0 wt % or more. If the silicon content is too high, a slag is undesirably formed in the welding process, and the ductility of the weld zone is decreased, resulting in poor fatigue properties.

(iii) Manganese (Mn): 12.0~14.0 wt %

Manganese, which is a typical austenite-stabilizing element for enlarging the austenitic region in the Fe—C phase diagram, is preferably added in a large amount such that an austenitic structure is reliably produced and maintained in a deposit metal, more particularly, a weld metal. Because the weld structure has poor properties compared to a wrought structure, manganese must be suitably added to increase the strength of the weld structure. Accordingly, in preferred embodiments, manganese content is set to 12.0 wt % or more. However, in the case where the manganese content is 15 wt % or more, the ductility of the weld structure is suitably decreased and thus fatigue strength is lowered. Therefore, the upper limit of manganese content is preferably controlled to 14.0 wt %. Further, if the manganese content is too high in the welding wire, a slag is disadvantageously formed in the welding process.

(iv) Chromium (Cr): 7.0~9.0 wt %

Chromium, which is a typical element for increasing corrosion resistance, may cause the grain-boundary precipitation of $Cr_{23}C_6$ as mentioned above to suitably decrease intergranular corrosion resistance of the weld zone. In certain preferred embodiments, for example in the case where the carbon content in the welding wire is maintained as low as 0.03 wt % or less, chromium plays a role in reducing the production of martensite and ledeburite near the heat affected zone while forming a small amount of chromium carbide. Preferably, because chromium has a molecular weight of 52, which is similar to a molecular weight (56) of iron, it is used in place of iron, thereby contributing to reinforcement of the structure of the weld zone. In consideration of these properties, chromium content in the welding wire is set to 7.0 wt % or more. However, because weldability is in inverse proportion to the chromium content, the upper limit of the chromium content is suitably controlled to 9 wt % or less.

(v) Nickel (Ni): 45.0~47.0 wt %

Nickel functions to preferably increase corrosion resistance of the weld zone and to reliably produce and maintain the austenitic structure along with manganese, so that the production of martensite and ledeburite is inhibited in the weld zone, ultimately increasing the ductility of the weld zone. Nickel is preferably contained in a large amount of 45.0~47.0 wt % in the welding wire. In this composition range, nickel suitably lowers the coefficient of thermal expansion of the weld zone to thus reduce residual stress after the welding process. In this way, when residual stress is reduced, the weld structure may be stabilized and hot cracks may be prevented from occurring.

(vi) Molybdenum (Mo): 2.0~3.0 wt %

Molybdenum is an element which is highly resistant to corrosion and is contained in a high-temperature material in order to suitably increase high temperature strength and heat-fatigue resistance of the material. Molybdenum is preferably contained in an amount of 2.0~3.0 wt % in the weld zone so as to suitably prevent the deterioration of the properties of the weld zone at high temperatures. Molybdenum is a typical rare metal and can be expensive. Accordingly, the degree of improvement in properties, resulting from the addition of molybdenum exceeding 3.0 wt %, is not so high, when considering the high cost.

(vii) Niobium (Ni): 0.5~0.8 wt %

Niobium, which is has a high affinity for carbon, forms carbides such as NbC at high temperatures and thus consumes carbon that accumulates in the weld zone. Further, niobium typically increases oxidability, corrosion resistance, and has suitably high temperature strength, and these characteristics are expected to be exhibited even in the weld zone. However, too high a niobium content in the weld zone leads to the formation of a site in which weldability is suitably decreased and hot cracks occur, and therefore the upper limit of the niobium content is suitably controlled to 0.8 wt % or less.

In further exemplary embodiments, in order to confirm the superiority of the welding wire according to the present invention, the following test example is described.

TEST EXAMPLE

As shown in Table 2 below, the welding wire (example) having the composition according to the present invention and the welding wire (comparative example) made of SUS 309L were suitably prepared. Welding was conducted using these welding wires, and the generation of hot cracks in the weld zone was determined by inspection of the weld zone.

TABLE 2

| | Composition | | | | | | | |
|---|---|---|---|---|---|---|---|---|
| | C | Si | Mn | Cr | Ni | Fe | Nb | Mo |
| Ex. | 0.03 | 2.37 | 13.6 | 7.3 | 46.5 | 27.3 | 0.7 | 2.2 |
| C.Ex. | 0.025 | 0.41 | 1.58 | 22.4 | 12.88 | 62.0 | — | — |

Figure 4A:
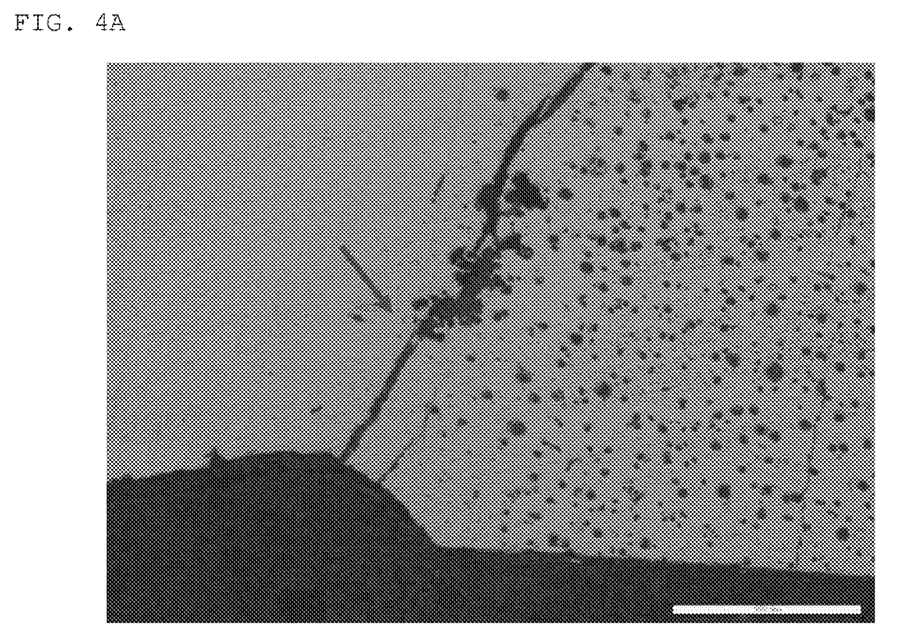
Figure 4B:
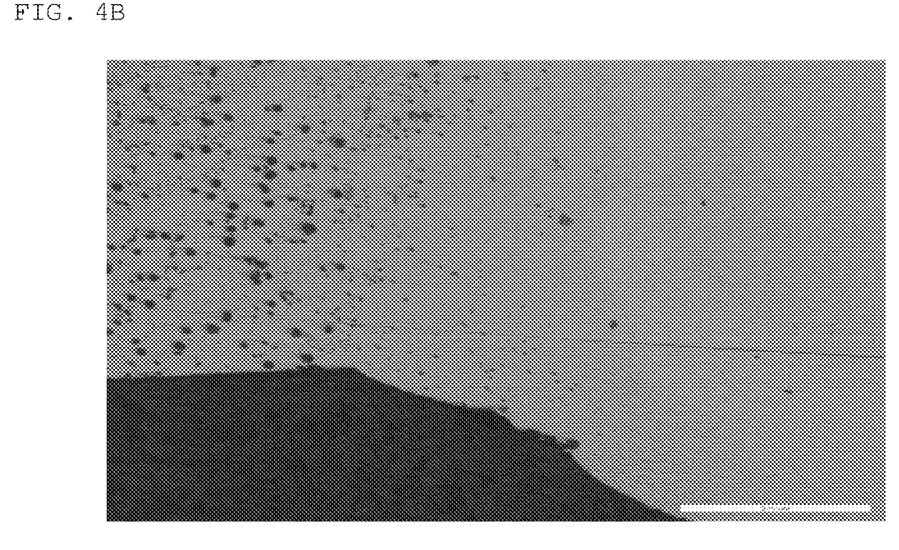

FIGS. 4A and 4B are exemplary micrographs of the weld zone after a stainless steel sheet and a cast iron sheet are suitably welded to each other. In the case of using the welding wire of the comparative example, hot cracks were generated (FIG. 4A). However, in the case of using the welding wire of the example, hot cracks did not occur, and the weld zone was suitably sound (FIG. 4B).

Figure 5:
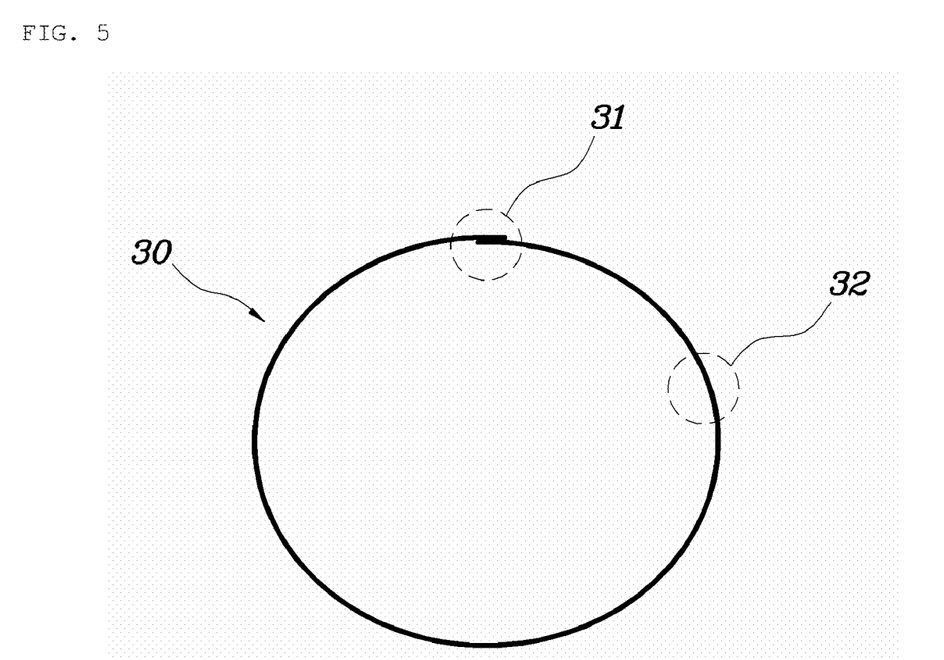
FIG. 5 is a view showing the welding process of the stainless steel part and the cast iron part of the exhaust manifold.

Unlike the welding of two sheets as in FIGS. 4A and 4B, the case where the stainless steel part and the cast iron part, each preferably having a cylindrical shape, are suitably welded to thus manufacture an exhaust manifold can be considered as follows. In certain preferred embodiments, for example as shown in exemplary FIG. 5, in the welding for the exhaust manifold, because the initial point of welding is overlapped with the final point of welding, the input heat for the initial point portion (second pass, 31) of welding is greater than for the other portion (first pass, 32), and thereby hot cracks are more frequently generated in the second pass 31 than in the first pass 32.

Figure 6A:
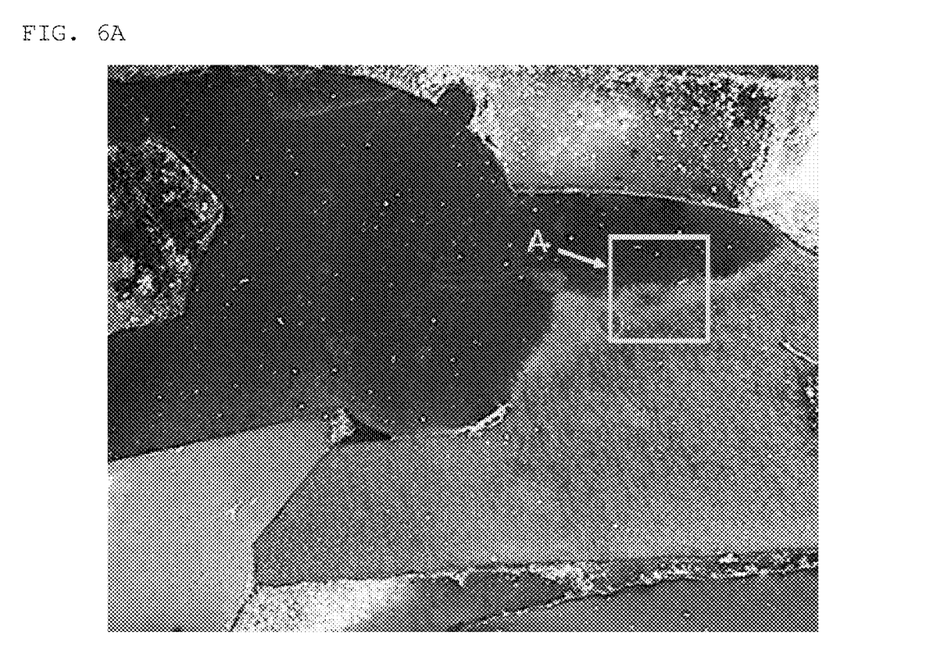
Figure 6B:
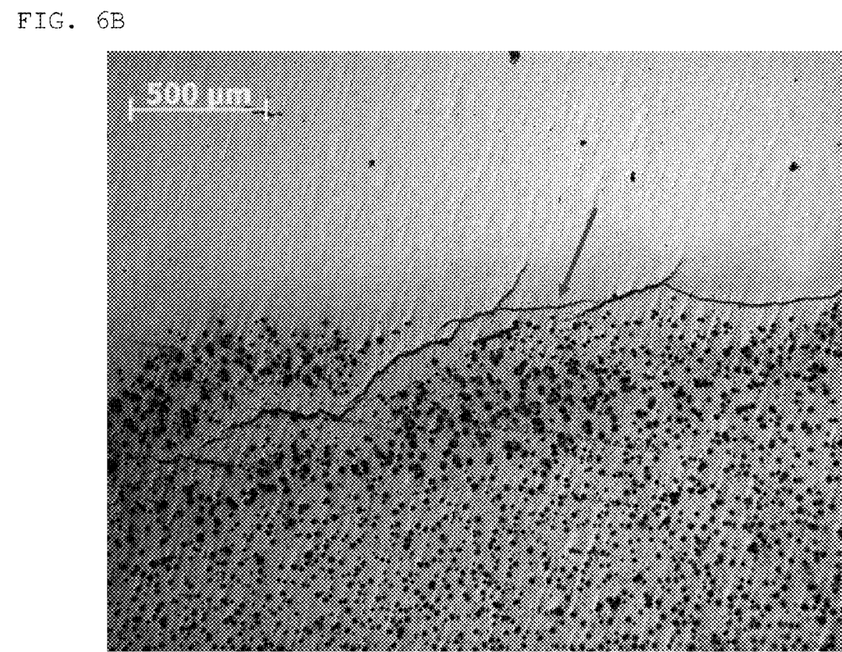
Figure 6C:
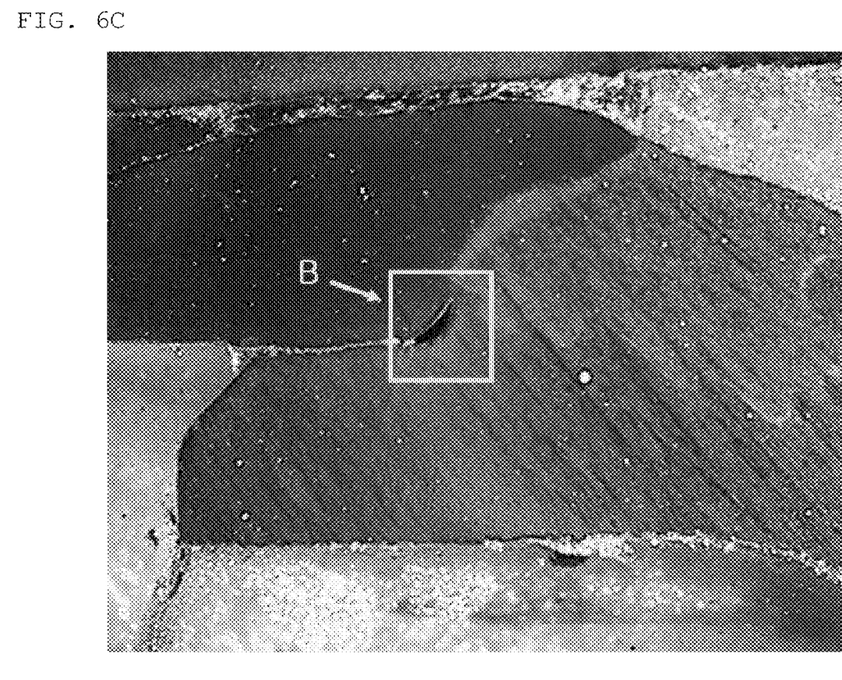
Figure 6D:
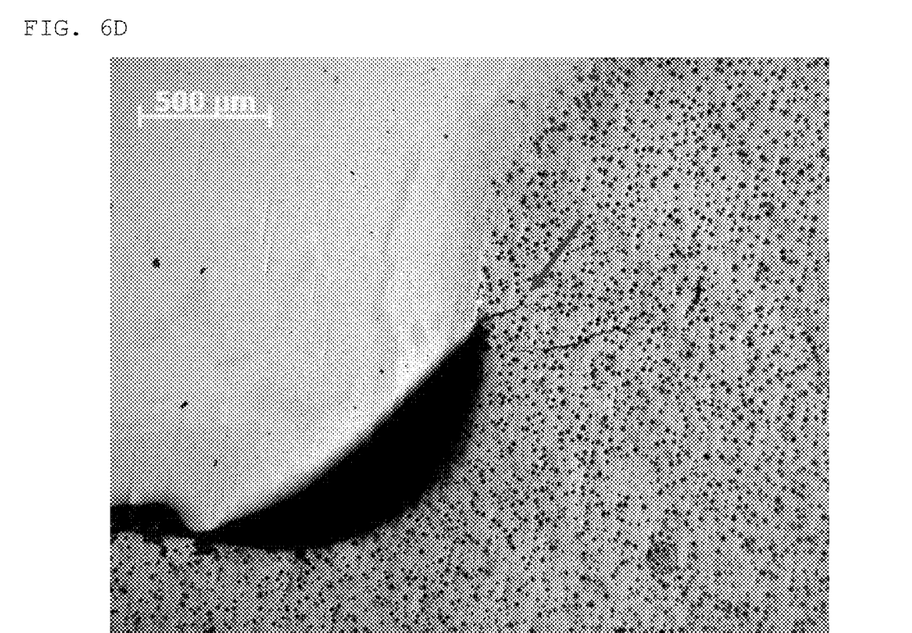

FIGS. 6A to 6D are micrographs showing the crack state of the weld zone after the stainless steel part and the cast iron part are suitably welded to each other using the welding wire of the comparative example. Specifically, FIGS. 6A and 6B are exemplary images for the second pass, and FIGS. 6C and 6D are exemplary images for the first pass. In certain embodiments, for example in the example of the second pass shown in FIG. 6A, hot cracks were generated long, as exemplified in FIG. 6B. In the case of the first pass shown in FIG. 6C, notches were generated as exemplified in FIG. 6D.

Figure 7A:
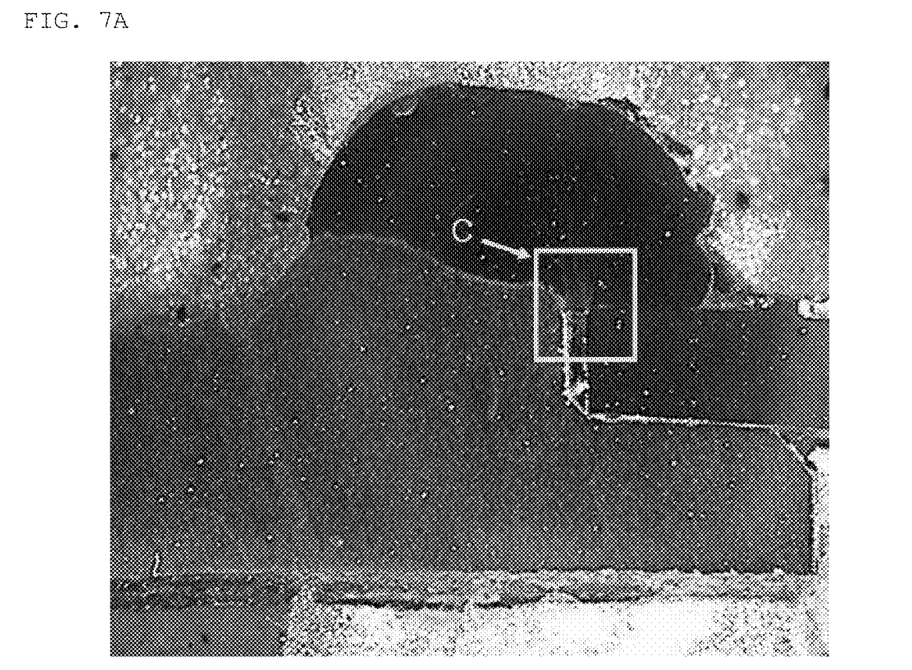
Figure 7B:
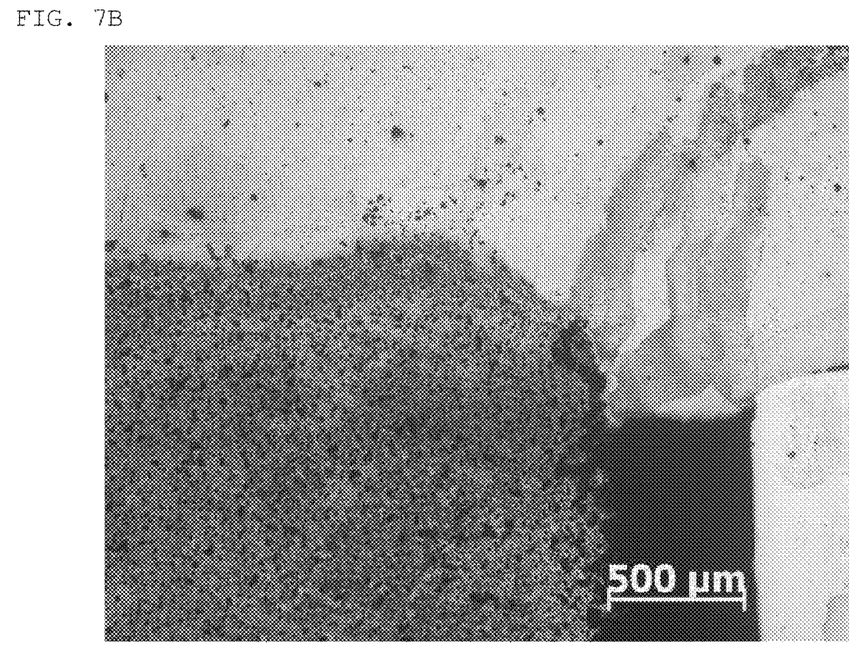
Figure 7C:
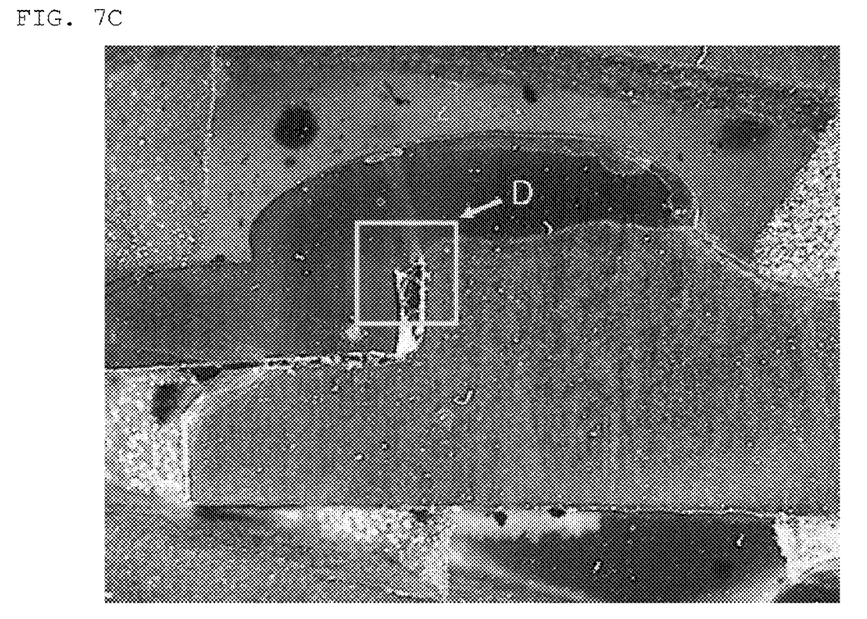
Figure 7D:
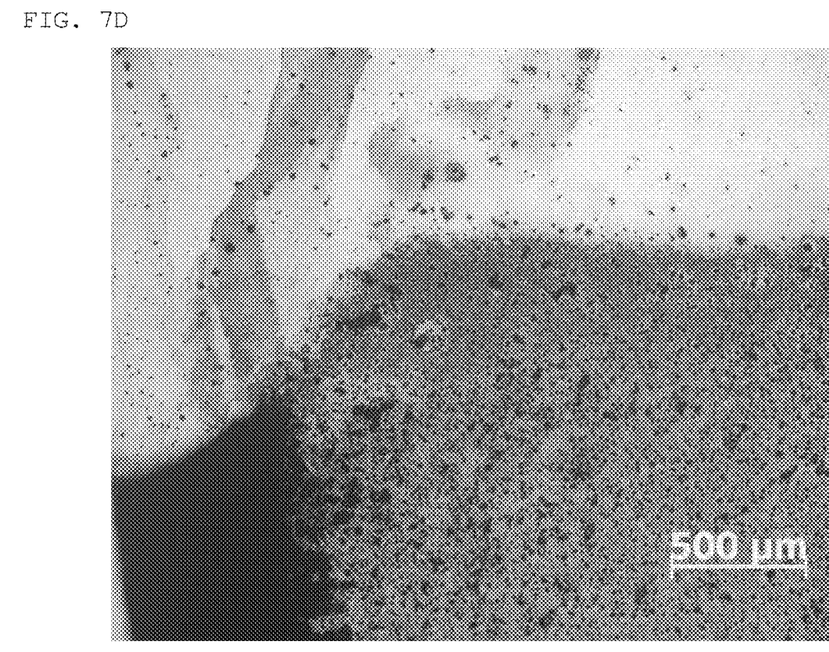

FIGS. 7A to 7D are micrographs showing further preferred embodiments where the crack state of the weld zone after the stainless steel part and the cast iron part are suitably welded to each other using the welding wire of the example. Specifically, FIGS. 7A and 7B are exemplary images for the second pass, and FIGS. 7C and 7D are exemplary images for the first pass. As seen in FIGS. 7B and 7D, both the second pass of FIG. 7A and the first pass of FIG. 7C had no cracks and were considered to be good. For reference, welding current, voltage, and speed were respectively 201 A, 22V, and 60 cm/min in the comparative example, and were respectively 180 A, 22V and 60 cm/min in the example.

Figure 8A:
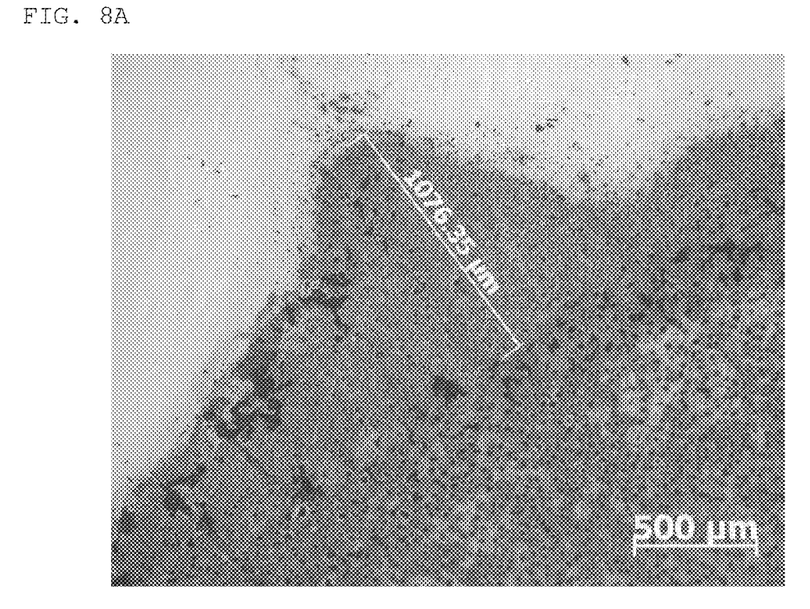
Figure 8B:
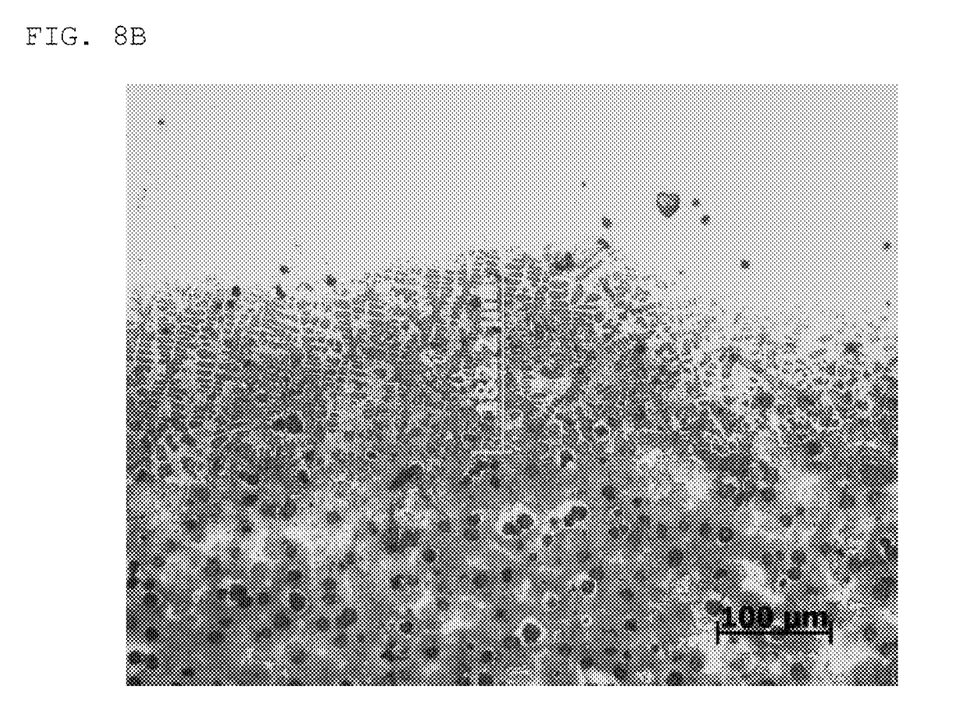

FIGS. 8A and 8B are photographs showing the ledeburite formed in the heat affected zone near the cast iron part. In the comparative example of FIG. 8A, ledeburite was formed to a thickness of 1076.35 μm at maximum, namely about 1000 μm. Whereas, according preferred embodiments, and as shown in the example of FIG. 8B, the maximum thickness of ledeburite was 182.2 μm, that is, did not exceed 200 μm. Although not shown in the drawings, in the comparative example, martensite was formed to a thickness of 1500 μm at maximum, and in the example, martensite was formed to a maximum thickness of 1000 μm. Accordingly, in the comparative example, the thickness of the hardened layer formed in the heat affected zone near cast iron was about 2.5 mm at maximum, but, in the example, the maximum thickness of the hardened layer was about 1.2 mm. Consequently, in preferred embodiments, and as shown in the example, the thickness of ledeburite was reduced to the level of 20%, and the thickness of the hardened layer was reduced to the level of less than 50%, compared to the comparative example.

Figure 9:
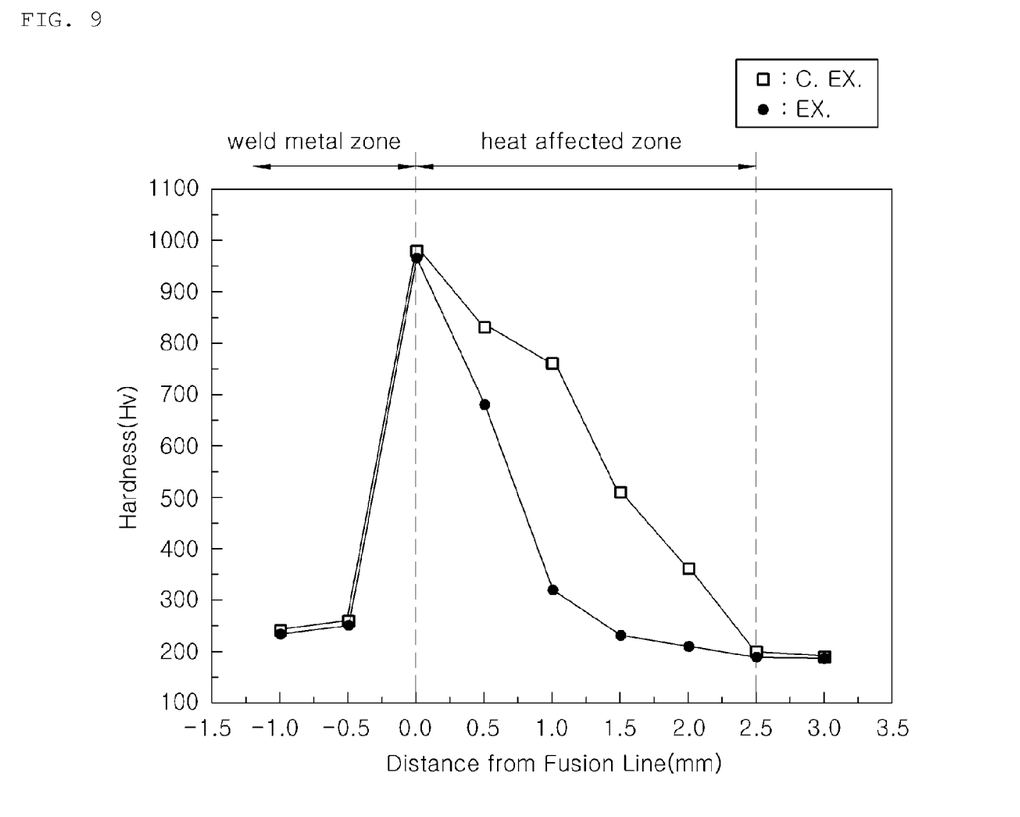
FIG. 9 is a graph showing the comparison of hardness between the weld zone formed using the welding wire of the example and the weld zone formed using the welding wire of the comparative example.

FIG. 9 is a graph showing the hardness of the heat affected zone near the cast iron part. In the example, the hardness of the heat affected zone is shown to be considerably lowered, compared to the comparative example. As described herein, this is attributed to the reduction in the thickness of the hardened layer, including martensite and ledeburite.

As described herein, the present invention provides a welding wire and a vehicle component preferably manufactured using the same. As described by the present invention, a joint which has no hot cracks and is sound and good can be suitably obtained.

In addition, a vehicle component, for example, an exhaust manifold, manufactured through joining of a stainless steel part and a cast iron part according to preferred embodiments of the invention as described herein, has increased durability and lifespan.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A welding wire for joining cast iron and stainless steel, having a composition comprising 0.03 wt % or less of C, 2.0~3.0 wt % of Si, 12.0~14.0 wt % of Mn, 7.0~9.0 wt % of Cr, 45.0~47.0 wt % of Ni, 0.5~0.8 wt % of Nb, and 2.0~3.0 wt % of Mo, with a balance of Fe.

2. A motor vehicle comprising the welding wire of claim 1.

3. A vehicle component manufactured by joining parts made of different materials, comprising:
   a first part made of stainless steel;
   a second part made of cast iron; and
   a weld zone between the first part and the second part which are joined to each other using a welding wire having a composition comprising 0.03 wt % or less of C, 2.0~3.0 wt % of Si, 12.0~14.0 wt % of Mn, 7.0~9.0 wt % of Cr, 45.0~47.0 wt % of Ni, 0.5~0.8 wt % of Nb, and 2.0~3.0 wt % of Mo, with a balance of Fe.

* * * * *